United States Patent
Miller

[11] 3,931,518
[45] Jan. 6, 1976

[54] OPTICAL FIBER POWER TAPS EMPLOYING MODE COUPLING MEANS

[75] Inventor: Stewart Edward Miller, Locust, N.J.

[73] Assignee: Bell Telephone Laboratories, Incorporated, Murray Hill, N.J.

[22] Filed: Nov. 11, 1974

[21] Appl. No.: 522,519

[52] U.S. Cl................. 250/227; 250/216; 350/96 C
[51] Int. Cl.²........................................... G02B 5/14
[58] Field of Search......... 250/227; 350/96 R, 96 C, 350/96 B, 96 WG

[56] References Cited
UNITED STATES PATENTS

| | | | |
|---|---|---|---|
| 3,058,021 | 10/1962 | Dunn | 250/227 X |
| 3,274,392 | 9/1966 | Harling | 250/227 |
| 3,350,654 | 10/1917 | Snitzer | 250/227 X |
| 3,412,255 | 11/1968 | Kreiger | 250/227 |
| 3,508,589 | 4/1970 | Derick et al. | 350/96 B X |
| 3,773,289 | 11/1973 | Gloge | 350/96 WG X |
| 3,777,149 | 12/1973 | Marcatili | 250/227 X |
| 3,801,389 | 4/1974 | Fujimara | 250/227 X |

*Primary Examiner*—Walter Stolwein
*Attorney, Agent, or Firm*—Thomas C. O'Konski; Wilford L. Wisner

[57] ABSTRACT

In an optical fiber power tap, signal power is coupled out of an optical fiber waveguide by a dielectric body disposed in a coupling relationship laterally offset from an intermediate length of the fiber, and is converted to a representative electrical signal suitable for utilization by a photodetector disposed adjacent to the dielectric body. In accordance with the disclosed invention, the operation of the fiber tap is improved by combining therewith means for coupling a portion of the signal power in the fiber from lower order modes to higher order modes. The mode coupling means illustratively comprises a pair of corrugated plates which is pressed against the fiber to periodically deform a region of the fiber just preceding the fiber tap. Provided the spatial periodicity of the corrugations in the plates is properly selected, and the pressure exerted on the plates is sufficiently large, the periodic deformation of the fiber causes the desired higher order mode coupling, and assures that there is sufficient power distributed in the higher order modes of the fiber for the dielectric coupling body of the fiber tap to couple out. The mode coupling means can be employed to provide an adjustable optical fiber tap, and can facilitate the tapping of clad fiber waveguides.

4 Claims, 5 Drawing Figures

OPTICAL FIBER POWER TAPS EMPLOYING MODE COUPLING MEANS

RELATED APPLICATIONS

This application is related to the concurrently filed applications of J. E. Goell, T. Li and W. M. Muska, Ser. No. 522,577, and of W. M. Muska, Ser. No. 522,518, both of which are assigned to the assignee hereof.

BACKGROUND OF THE INVENTION

This invention relates to optical fiber communication systems and, more particularly, to an arrangement for tapping optical power from an optical fiber waveguide without requiring that the fiber be terminated or broken.

Rapid progress has been made in the past few years in the design and fabrication of optical fiber wave-guiding structures. There are now available several different fiber structures which are capable of transmitting large quantities of information via modulated optical waves or pulses with transmission losses as low as two decibels per kilometer. It is expected that some day such fibers will replace, at least in part, the wire pairs, coaxial cables and metallic waveguides now used in conventional communication systems. The advantages of fiber systems over conventional systems include the small physical size and light weight of the fiber waveguides, the broad bandwidth capabilities which afford flexibility in the selection of a bandwidth to be utilized in any given system, the nonconductive, noninductive properties of the fiber waveguides, and the potentially low cost of fiber materials and fabrication. The prospects of future use of the fiber systems are indeed wide-ranging, and continue to expand.

One early implementation of fiber systems is likely to involve multi-terminal information transfer over short distance optical fiber links using light-emitting diodes, which have now been developed to the point of having sufficiently long operating lives, as the signal sources. Because of the light weight and the immunity to electromagnetic interference of fiber systems, fiber optical data bus links have been proposed for the transmission of control and intercom signals on board aircraft and ships. Other potential applications include interoffice trunks, such as those interconnecting telephone central offices within a city, "on premise" distribution links within a building or between adjacent buildings, and data bus links in computer or industrial-control systems.

In the longer range future, fiber systems are likely to be used for the high capacity transmission of digital information over long distance fiber links, with lasers as the signal source. Intercity telecommunication links may thus some day be provided using optical fibers. It appears likely that repeater spacings of several kilometers or more and information transmission rates up to the gigabit range will become technically feasible with such systems.

Whatever the application, it is clear that arrangements will be required for extracting signal wave information from the optical fiber waveguides. To monitor and control the transmission through a fiber link, for example, it may be required to sample the signal propagating through the individual fiber waveguides periodically along the link. Optical data bus links will require that signals be extracted for utilization at numerous selected points along the link. In most instances, it would be desirable if a portion of the signal propagating through the fiber could be tapped therefrom without breaking or terminating the fiber. Fiber terminations can add unwanted optical losses to the system, and would unfavorably increase the need for highly precise fiber splicing and interconnecting arrangements.

In the concurrently filed applications of J. E. Goell, T. Li and W. M. Muska, Ser. No. 522,577, and of W. M. Muska, Ser. No. 522,518, there is disclosed a variety of arrangements for tapping signal power from an intermediate portion of an optical fiber waveguide without requiring that the fiber be terminated or broken. In each illustrative embodiment of the optical fiber power tap disclosed in the cited applications, power is coupled out of the fiber waveguide by a dielectric body disposed in a coupling relationship with an intermediate length of the fiber, and is converted to a representative electrical signal suitable for utilization by a photodetector disposed adjacent to the dielectric body. To tap clad fiber waveguides, all or most of the outer cladding is removed from the fiber in the vicinity of the fiber tap so that the dielectric body of the tap can extract power directly from the inner core. The dielectric body of the tap is disposed at least within about three optical wavelengths of the inner core to achieve the desired coupling relationship. Alternatively, the fiber is bent in the vicinity of the fiber tap to cause a portion of the optical power to radiate out of the inner core into the outer cladding from which it can be extracted by the dielectric body. In either case, some fraction of the power is tapped from the fiber, provided the index of refraction of the dielectric body is approximately equal to, or greater than, the index of refraction of the outer cladding of the fiber.

With multimode fiber waveguides, that is, with fiber waveguides in which the optical power is distributed among a plurality of propagating modes of different orders, the dielectric coupling body of the fiber tap tends to extract only the higher order mode power from the fiber at the point where it is attached. Accordingly, when one or more fiber taps are added further along the fiber, there is typically less power in the higher order modes for the additional taps to couple out. Systems requiring multiple taps closely spaced along a single fiber could thus be difficult to implement.

SUMMARY OF THE INVENTION

In accordance with the present invention, the optical fiber power taps disclosed in the above-cited Goell et al and Muska applications are improved by combining therewith means for coupling optical power propagating in an optical fiber waveguide from lower order modes to higher order modes. The mode coupling means illustratively takes the form of one or more corrugated plates which are pressed against the fiber to periodically deform a region of the fiber just preceding the fiber tap. Provided the spatial periodicity of the corrugations in the plates is properly selected, and the pressure exerted on the plates is sufficiently large, the periodic deformation of the fiber causes the desired higher order mode coupling, and assures that there is sufficient power distributed in the higher order modes of the fiber for the dielectric coupling body of the fiber to couple out. Multiple tapping along a single fiber can thus be accomplished simply by providing each fiber tap with its own mode coupling means.

In accordance with a specific feature of the invention, it has been found that the mode coupling means can be used to provide an adjustable optical fiber power tap. Specifically, by adjusting the pressure that the plates exert against the fiber, it is possible to adjust the degree of higher order mode coupling that takes place in the fiber. This, in turn, provides a convenient way of adjusting the amount of power that is tapped from the fiber by the dielectric coupling body of each fiber tap.

Additionally, the mode coupling means of the invention can be used to facilitate the tapping of clad fiber waveguides. As is well known, clad fiber waveguides include an inner core of a low optical loss material surrounded by a lower refractive index outer cladding. The optical power in such fibers is essentially confined within the inner core, with little power in the outer cladding.

In the above-cited Goell et al and Muska applications, clad fiber waveguides are tapped either by removing all or most of the outer cladding from the fiber in the vicinity of the fiber tap, or alternatively, by bending the fiber in the vicinity of the fiber tap to cause power to radiate out of the inner core into the outer cladding.

In contrast, in accordance with an illustrative embodiment of the present invention, the mode coupling means is used to couple a portion of the optical power in the fiber from core modes to cladding modes. The embodiment can thus be used to tap clad fiber waveguides without requiring that the cladding be removed, or that the fiber be bent, in the vicinity of the fiber tap.

BRIEF DESCRIPTION OF THE DRAWING

These and other features and advantages of the invention will be better understood from the following detailed description taken in conjunction with the accompanying drawing in which.

DETAILED DESCRIPTION

Figure 1:
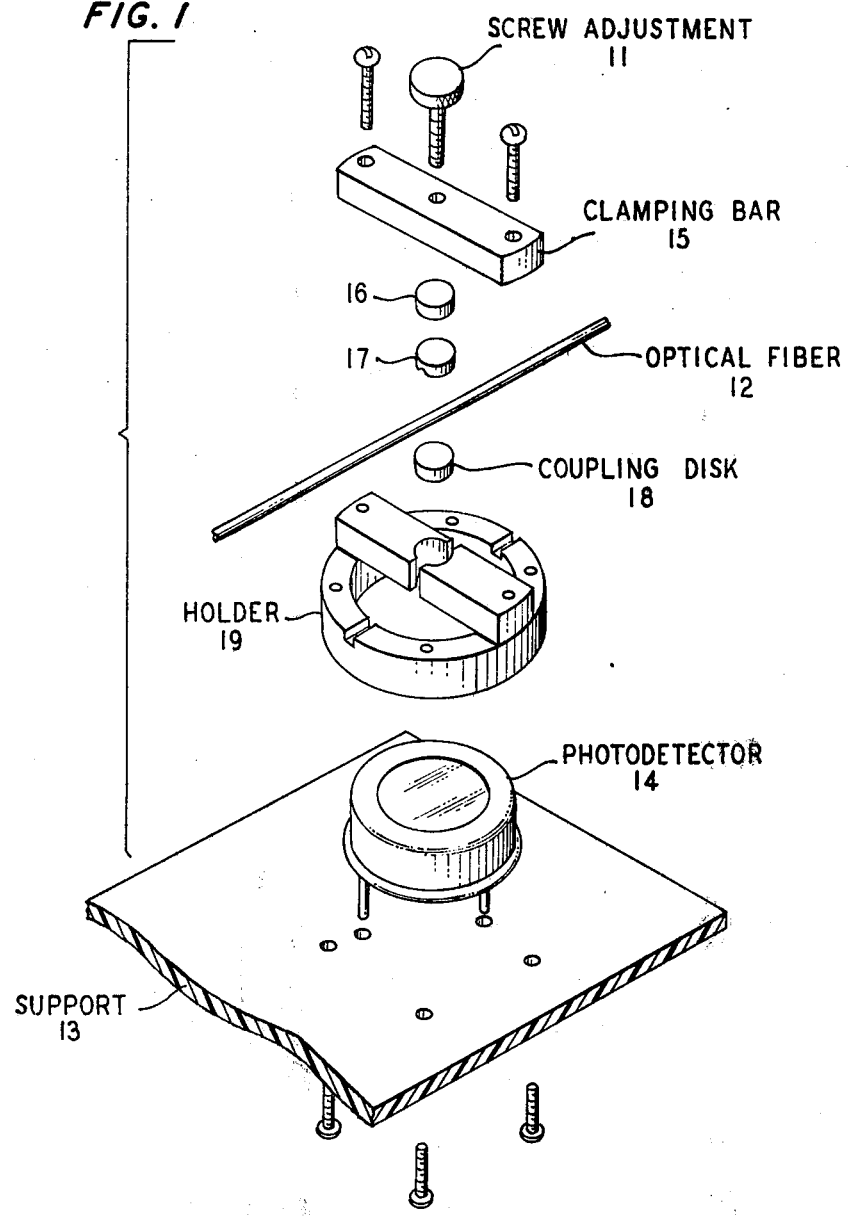
FIG. 1 is an exploded, perspective view of an illustrative embodiment of the optical fiber power tap disclosed in the above-cited applications of Goell et al and of Muska, respectively, reproduced herein for convenience.

FIG. 1 is an exploded perspective view of an illustrative embodiment of the optical fiber power tap, which is disclosed in the above-cited applications of Goell et al and of Muska, respectively. It will be assumed for present purposes that optical fiber 12 is an intermediate length of a clad multimode fiber waveguide from which all or most of the cladding has been removed in the vicinity of the tap. As noted hereinabove, a multimode fiber waveguide is one that is capable of guiding a plurality of modes of propagation of different orders. Photodetector 14 is illustratively a solid state photodiode of the p-i-n form, such as the SGD 100A, 100 mil, silicon p-i-n photodiode manufactured and offered commercially by E. G. & G., Inc. It is designed to respond to the wavelength of the optical signal propagating through fiber 12, which is illustratively about one micrometer ($\mu$m).

As shown in FIG. 1, fiber 12 is sandwiched between dielectric bodies 17 and 18, each of which is illustratively in the shape of a disk having a cross-sectional area larger than the cross-sectional area of the fiber. Disk 17 is illustratively formed of a relatively hard dielectric material, such as a glass or hard plastic, having an index of refraction less than that of disk 18 and less than that of the fiber cladding material. Disk 18, which serves to couple optical power out of fiber 12, is illustratively formed of a relatively compliant dielectric material, such as a soft plastic, having an index of refraction approximately equal to or greater than that of the outer cladding of fiber 12. Specifically, as noted in the cited Goell et al and Muska applications, disk 18 has an index which is in the range of about 0.8 times the index of the fiber cladding material and greater.

When disks 17 and 18 are forced together with fiber 12 between them, the fiber is made to deform the upper surface of disk 18 and to provide a relatively large area of contact therewith. Disk 18 can thus extract power from fiber 12, which power is in turn intercepted and detected by photodetector 14. Generally, the amount of power extracted from the fiber increases as the index of refraction of disk 18 is increased. Illustratively, disks 17 and 18 have a diameter of about one millimeter (mm).

The assembly of disks 17 and 18, fiber 12 and photodetector 14 is inserted in a specially designed holder 19 which, in turn, is fixed to a suitably perforated support 13. Holder 19, which is illustratively formed of a metal, such as brass, serves to maintain good optical contact and alignment among the respective tapping elements during the handling and use of the fiber tap. Clamping bar 15 is illustratively fastened to holder 19 after disks 17 and 18, fiber 12 and spacer 16 are inserted in the holder. Screw adjustment 11 in clamping bar 15 allows the pressure exerted on disk 17 to be varied. Spacer 16 prevents damage to disk 17 during the tightening of screw adjustment 11.

For a more detailed description of the structure and operation of this and other illustrative embodiments of the optical fiber power tap, reference should be made to the above-cited Goell et al and Muska applications.

As noted hereinabove, the dielectric coupling body in this and other embodiments of the fiber tap (e.g., coupling disk 18 in FIG. 1) is such that it tends to extract only the higher order mode power from the fiber at the point where it is attached. The higher order mode power is, in general, concentrated closer to the exterior surface of the fiber core than the lower order mode power. Additionally, the evanescent fields of the higher order mode power extend through greater distances beyond the exterior surface of the fiber core than do the evanescent fields of the lower order mode power. The higher order mode power is thus more readily accessible to the coupling body and is more readily coupled out thereby. This fact can give rise to problems under certain circumstances. For example, if there is relatively little power distributed in the higher order modes of the fiber that is to be tapped, there is relatively little power present in the fiber for the coupling body to couple out. The tapped signal could thus be relatively weak, and subsequent taps made at the same point along the fiber could extract different fractions of the power from the fiber depending, for example, upon whether or not the fiber is unintentionally disturbed or bent in a way to induce mode coupling therein. Moreover, if multiple taps are closely spaced along a single fiber waveguide, such as in an optical data bus link having a multi-terminal output, the amount of power extracted by each tap would typically decrease with distance along the fiber. To provide equal taps along the link, techniques for compensating for the decrease in higher order mode power along the fiber would be required.

The present invention is intended to improve the operation of the optical fiber power tap under these and other circumstances by combining therewith means for coupling the optical power in a fiber waveguide from lower order modes to higher order modes.

Figure 2:
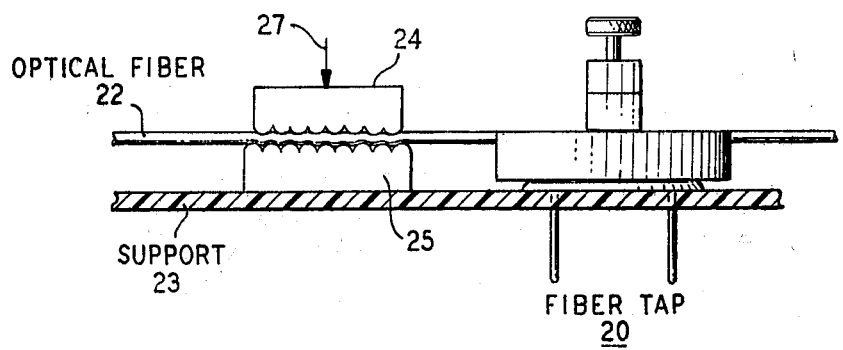
FIG. 2 is a side view of an illustrative embodiment of the present invention combining a mode coupling means with an optical fiber power tap.

FIG. 2 is a side view of an illustrative embodiment of the invention. Optical fiber power tap 20, which is shown in assembled form attached to multimode optical fiber waveguide 22, is illustratively identical to the fiber tap shown in FIG. 1. Wave energy is assumed to be propagating in fiber 22 from left to right in the figure. The mode coupling means of the embodiment comprises a pair of corrugated plates 24 and 25 which are pressed against fiber 22 to periodically deform a region of the fiber preceding fiber tap 20. Plates 24 and 25 can be pressed against a region of fiber 22 from which all or most of the outer cladding has been removed, as shown, or, alternatively, can be pressed directly against a region of the fiber which includes its outer cladding. In either case, the spatial periodicity of the corrugations in plates 24 and 25, and the pressure that the plates exert on fiber 22 (e.g., pressure is illustratively applied to plate 24 in the direction of arrow 27 in FIG. 2), are selected so that a periodic deformation results in the cross-sectional dimensions of the inner core of fiber 22, or in the direction of the axis of the inner core of fiber 22, or both. The desired higher order mode coupling occurs in fiber 22 provided the spatial periodicity of the corrugations in plates 24 and 25, and thus of the deformation in fiber 22, is properly selected.

Figure 3:
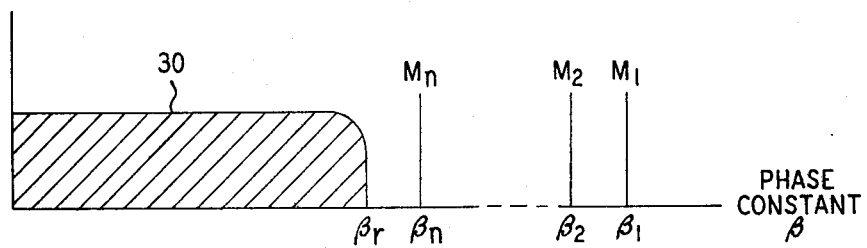
FIG. 3 is an illustration of the mode distribution as a function of phase constant in a multimode fiber waveguide, included herein for purposes of explanation.

The selection of the appropriate spatial periodicity for the mode coupling means is made in accordance with the theory set forth in the articles by D. Marcuse and by D. Marcuse and R. M. Derosier, respectively, published in Volume 48 of the *Bell System Technical Journal*, pages 3187–3232 (December 1969). FIG. 3 of the drawing shows a typical mode distribution in a multimode fiber waveguide as a function of phase constant. In general, there is a distribution of discrete guided modes $M_1, M_2 \ldots M_n$ having phase constants $\beta_1, \beta_2 \ldots \beta_n$, respectively. There is, in addition, a continuum of radiation modes starting at phase constant $\beta_4$ that is less than the phase constants of the guided modes, as represented by the area bounded by curve 30. In order to couple from a lower order mode, such as $M_1$, to a higher order mode, such as $M_n$, the spatial periodicity $\Lambda$ of the deformation in the fiber is selected to be approximately equal to the beat wavelength $\lambda_b$ of the two modes as follows:

$$\Lambda \simeq \lambda_{1n} = \frac{2\pi}{\beta_1 - \beta_n} \quad (1)$$

where $\beta_1$ and $\beta_n$ are the phase constants of the $M_1$ mode and $M_n$ mode, respectively. In general, it is sufficient if the spectrum of the spatial periodicity $\Lambda$ of the deformation includes components at the beat wavelength $\lambda_b$ of the two modes to be coupled, and may include many other components. Coupling among all guided modes in the fiber (i.e., $M_1$ through $M_n$) can be achieved by selecting the spatial periodicity $\Lambda$ of the deformation to approximate a random superposition of the respective beat wavelengths between each of the guided modes in the fiber.

Although the respective phase constants for the individual modes in a multimode fiber depend upon the specific fiber dimensions, the relative core-cladding refractive indices, and the wavelength of the propagating optical signal, the spatial periodicities $\Lambda$ suitable for inducing higher order mode coupling in a fiber typically range from about 0.01 to 10 millimeters (mm). As a specific numerical example of the selection of an appropriate spatial periodicity for the mode coupling means, consider a fiber having an inner core diameter of about 50 $\mu$m, a core index of 1.5, and a core-cladding index difference of 1 percent. Then at a wavelength of 1 $\mu$m the coupling period for coupling between adjacent lowest order mode is 10 mm and for adjacent modes near cut-off is 0.7 mm; the period for coupling between core modes and cladding modes is in the range 0.06 mm to 1.0 mm.

A variety of materials and techniques can be used in the fabrication of mode coupling plates 24 and 25. Of course, the structure and materials of plates 24 and 25 should be such that they provide the desired periodic deformation of the fiber core without otherwise damaging (e.g., breaking or scratching) the fiber. For this reason, corrugations in plates 24 and 25 having smooth, or rounded, ridges, of the type shown in FIG. 2, are preferred over corrugations having sharp points. Suitable mode coupling plates can be fabricated, for example, by gluing a plurality of metal balls (e.g., ball bearings) of the appropriate diameter to a plastic or metal plate with a layer of epoxy. Mode coupling plates can also be fabricated by embossing corrugations into plastic plates with a die of the appropriate spatial periodicity, much as is done in the fabrication of phonograph records. Additionally, although two corrugated plates 24 and 25 are shown in FIG. 2, it should be noted that only one corrugated plate is necessary to provide the desired periodic deformation in the fiber. For example, one of plates 24 and 25 could be flat surfaced plate of a relatively compliant material, such as a soft plastic, while the other of the plates is corrugated, as described above.

As shown in the cited papers by Marcuse and by Marcuse and Derosier, the fractional power coupled into any particular higher order mode from any particular lower order mode due to a periodic deformation of the fiber core of a spatial periodicity $\Lambda$ approximating the beat wavelength $\lambda_b$ between these modes is related to the amplitude $a$ of the deformation and the length L of the region of the deformation in the fiber generally as follows:

$$\frac{\Delta P}{P} \sim a^2 L^2, \quad (2)$$

where P is the power incident in the lower order mode and $\Delta P$ is the power coupled to the higher order mode from the lower order mode. Assuming that the coupling length L is selected to be constant, the degree of higher order mode coupling in the fiber is determined primarily by the amplitude $a$ of the mode coupling deformation that is induced therein. As noted earlier, the amount of power that is tapped from the fiber by the fiber tap can be controlled by controlling the amount of power that is distributed in the higher order modes of the fiber. It is accordingly possible to provide an adjustable fiber tap by including therewith a mode coupling means capable of inducing an adjustable amplitude of deformation in the fiber.

Figure 4A:
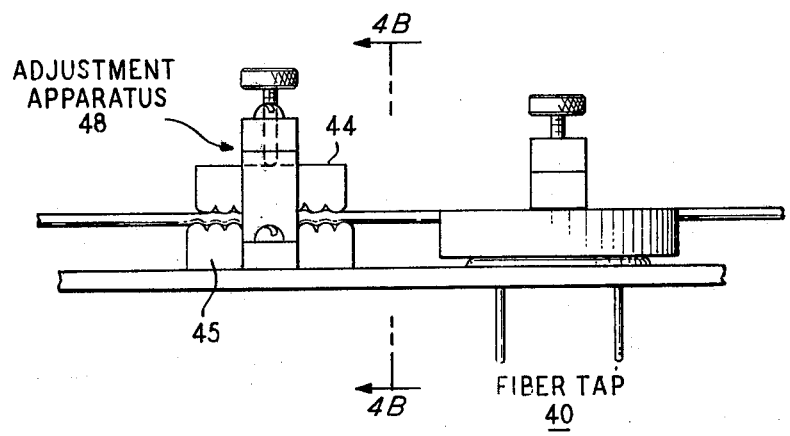
FIGS. 4A and 4B are orthogonal views of another illustrative embodiment of the present invention useful as an adjustable optical fiber power tap.
Figure 4B:
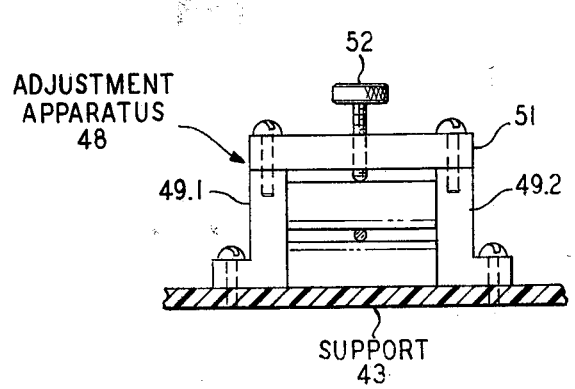

FIGS. 4A and 4B show an illustrative version of an adjustable fiber tap embodied in accordance with this invention. Fiber tap 40 of FIG. 4A, shown in assembled form attached to multimode fiber 42, is illustratively identical to the fiber tap shown in FIG. 1. Corrugated mode coupling plates 44 and 45, like plates 24 and 25 of FIG. 2, are pressed against fiber 42 to provide, in a region of the fiber preceding fiber tap 40, a periodic deformation of an appropriate spatial periodicity Λ for mode coupling. The amplitude a of the deformation induced in fiber 42 is controlled by adjustment apparatus 48. As shown more clearly in the orthogonal view of FIG. 4B, adjustment apparatus 48 illustratively comprises two L-shaped brackets 49.1 and 49.2 illustratively formed of a metal, such as brass, which are fastened to support 43. Corrugated plates 44 and 45 with fiber 42 disposed therebetween are placed between brackets 49.1 and 49.2 of the adjustment apparatus. A clamping bar 51, also illustratively formed of a metal, is then fastened across brackets 49.1 and 49.2, as shown in the figures. Clamping bar 51 includes a centrally disposed threaded hole into which screw adjustment 52 is inserted and can be tightened. By tightening screw adjustment 52, the downward pressure exerted on plate 44 is increased, increasing the amplitude a of the deformation induced in fiber 42. The amount of power distributed in the higher order modes of fiber 42 in the vicinity of fiber tap 40 is thereby increased. This, in turn, increases the amount of power tapped from fiber 42 by fiber tap 40. By selecting the appropriate setting of screw adjustment 52, the desired fraction of signal power can be tapped from the fiber.

In addition to coupling power among guided modes in the fiber, it is possible to couple power from guided modes to radiation modes provided the spatial periodicity Λ of the mode coupling means is properly selected. Specifically, by selecting the spatial periodicity $$\Lambda \leq \frac{2\pi}{\beta_n - \beta_r} \quad (3)$$

where $\beta_n$ is the phase constant for the $n^{th}$ guided mode and $\beta_4$ is the cut-off in phase constant for radiation modes, as illustrated in FIG. 3, optical power will be coupled from a guided mode to radiation modes. This fact can be of particular significance in the tapping of clad fiber waveguides. The effect in a clad fiber waveguide is to couple optical power out of the fiber core into its outer cladding. Once optical power is distributed in the outer cladding of the fiber, it can be extracted directly therefrom by the coupling body of the fiber tap (e.g., coupling disk 18 of the embodiment of FIG. 1). Clad fiber waveguides, both of the multimode variety and of the single mode variety, can thus be tapped directly using a mode coupling means of the type disclosed herein without requiring that all or most of the outer cladding be removed from the fiber in the vicinity of the fiber tap. For the case of a single mode fiber, $\beta_n$ of Equation (3) is the phase constant of the single guided mode in the fiber, while $\beta_r$ is the cut-off in phase constant for radiation modes. Optical fibers 22 and 42 in the illustrative embodiments of FIGS. 2 and 4A and 4B, respectively, can thus be clad fiber waveguides which can be tapped without stripping the outer cladding therefrom, provided the spatial periodicity of mode coupling plates 24 and 25, and 44 and 45, is selected in accordance with Equation (3) above. For the specific fiber structure illustratively described hereinabove, the spatial periodicity ranges from about 0.06 to 1.0 mm to provide the desired core to cladding coupling.

It is to be understood that the above-described embodiments are illustrative of but a few of the many possible specific embodiments which can represent applications of the principles of the invention, as defined by the appended claims.

What is claimed is:

1. An arrangement for tapping optical power from an intermediate portion of a multimode optical fiber waveguide without requiring that the fiber be terminated or broken, said fiber including a guiding region in which the optical power is essentially confined and a cladding medium surrounding the guiding region, said arrangement being characterized by:
    means disposed at a first intermediate longitudinal position along said fiber for enhancing mode coupling from lower order modes in said fiber to higher order modes in said fiber;
    a body of dielectric material disposed in a coupling relationship laterally offset from a second intermediate longitudinal position along said fiber spaced along the wave path from said first longitudinal position for coupling optical power out of said guiding region of said fiber, said body having an index of refraction which is approximately equal to or greater than the index of refraction of the medium surrounding said guiding region of said fiber; and
    a photodetector responsive to the wavelength of the optical signal to be propagated through said fiber and disposed adjacent to said dielectric body, said photodetector being oriented to intercept the optical power coupled out of said guiding region of said fiber by said dielectric body.

2. The tapping arrangement of claim 1 in which said mode coupling means comprises at least one corrugated plate which is pressed against said first intermediate longitudinal position of said fiber to periodically deform said guiding region of said fiber, said deformation having a spatial periodicity equal to the beat wavelength between a pair of guided modes in said fiber.

3. An arrangement for tapping optical power from an intermediate portion of an optical fiber waveguide without requiring that the fiber be terminated or broken, said fiber comprising an inner core formed of a low optical loss material in which the optical power is essentially confined, said inner core being surrounded by an outer cladding having an index of refraction less than that of said inner core, said arrangement being characterized by:
    means disposed at a first intermediate longitudinal position along said fiber for coupling a portion of the optical power in said fiber from said inner core to said outer cladding;
    a body of dielectric material disposed in contact with a second intermediate longitudinal position along said fiber spaced along the wave path from said first longitudinal position for coupling optical power out of said outer cladding of said fiber, said body having an index of refraction which is approximately equal to or greater than the index of refraction of said outer cladding of said fiber; and
a photodetector responsive to the wavelength of the optical signal to be propagated through said fiber and disposed adjacent to said dielectric body, said photodetector being oriented to intercept the optical power coupled out of said outer cladding of said fiber by said dielectric body.

4. The tapping arrangement of claim 3 in which mode coupling means comprises at least one corrugated plate which is pressed against said first intermediate longitudinal position of said fiber to periodically deform said inner core of said fiber, said deformation having a spatial periodicity equal to the beat wavelength between a core mode and a cladding mode in said fiber.

* * * * *

UNITED STATES PATENT AND TRADEMARK OFFICE
CERTIFICATE OF CORRECTION

PATENT NO. : 3,931,518
DATED : January 6, 1976
INVENTOR(S) : Stewart E. Miller

It is certified that error appears in the above-identified patent and that said Letters Patent are hereby corrected as shown below:

Column 5, line 53, "$\beta_4$" should read --$\beta_r$--.

Column 6, that portion of line 46 which reads "could be flat surfaced" should read --could be a flat surfaced--;

Column 6, line 56, "a" should be italicized;

Column 6, line 68, "a" should be italicized.

Column 7, line 18, "a" should be italicized;

Column 7, line 53, "$\beta_4$" should read --$\beta_r$--.

Signed and Sealed this sixth Day of April 1976

[SEAL]

Attest:

RUTH C. MASON
*Attesting Officer*

C. MARSHALL DANN
*Commissioner of Patents and Trademarks*